B. W. DAVIS.
HEATING AND VENTILATING SYSTEM.
APPLICATION FILED JAN. 6, 1906.
1,179,406.
Patented Apr. 18, 1916.
3 SHEETS—SHEET 2.
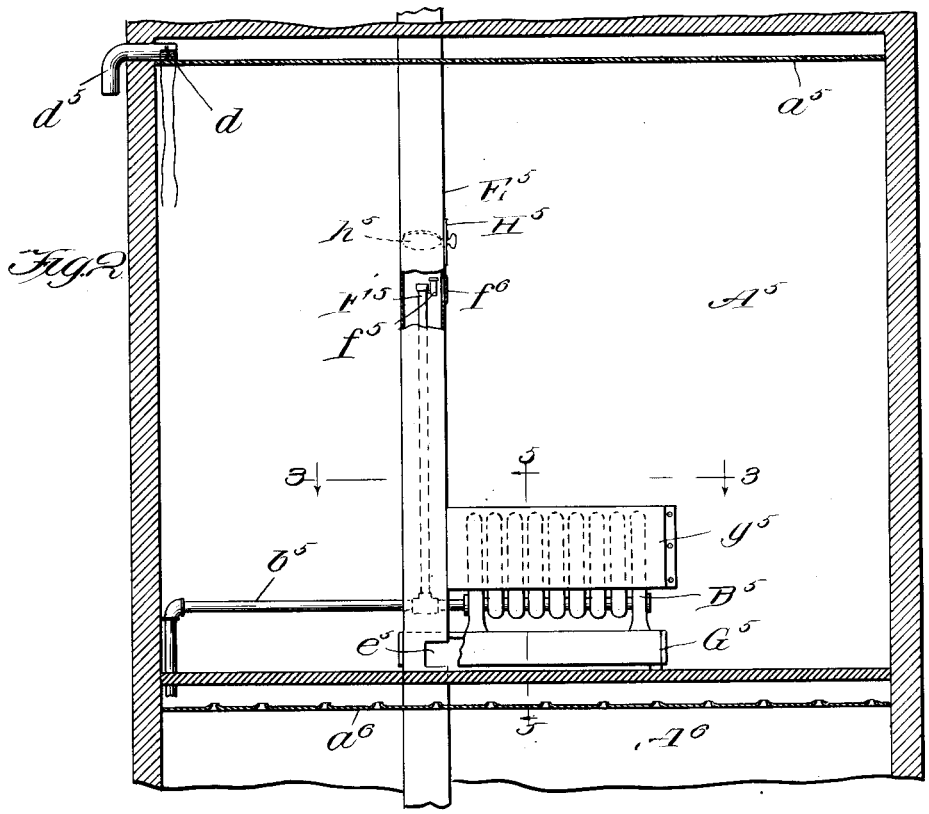
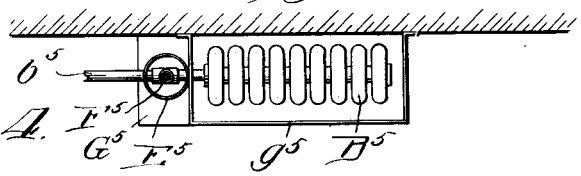
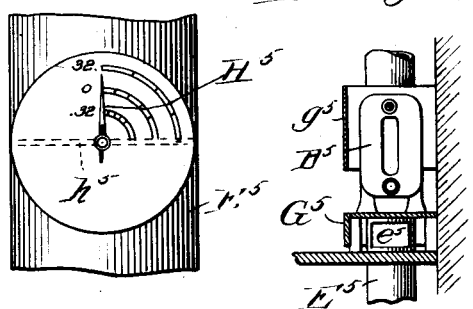
Witnesses:
H. S. Gaither
C. A. Mullen
Inventor:
Benjamin W. Davis
by Lamberton & Wilkinson
Attys B. W. DAVIS.
HEATING AND VENTILATING SYSTEM.
APPLICATION FILED JAN. 6, 1906.
1,179,406.
Patented Apr. 18, 1916.
3 SHEETS—SHEET 3.
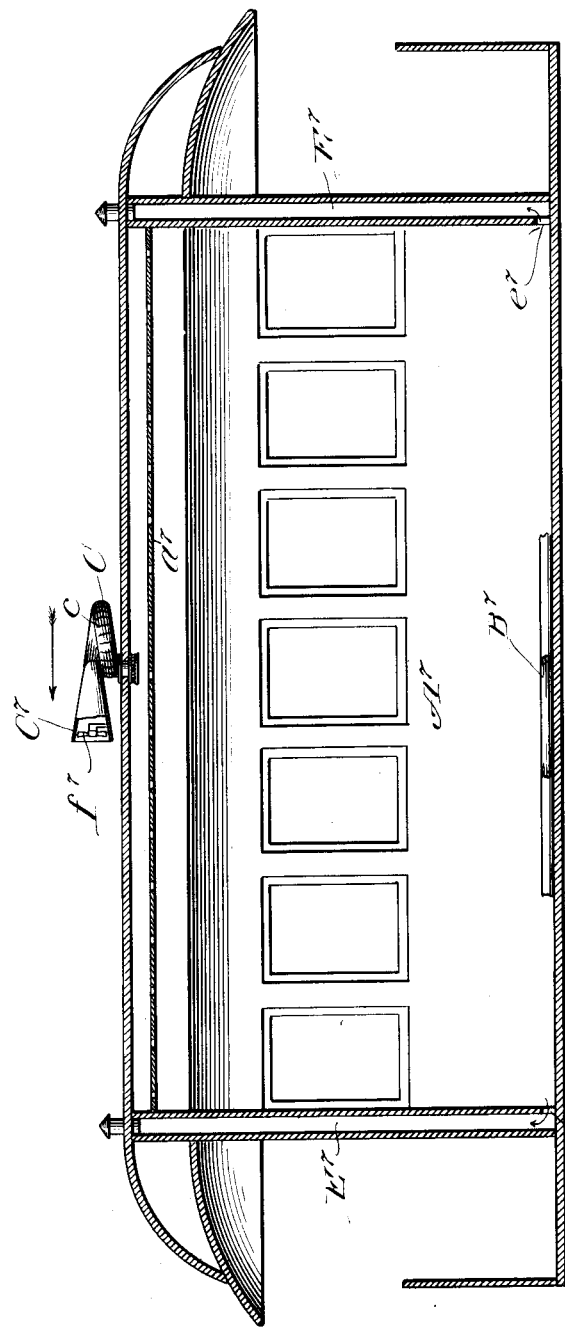

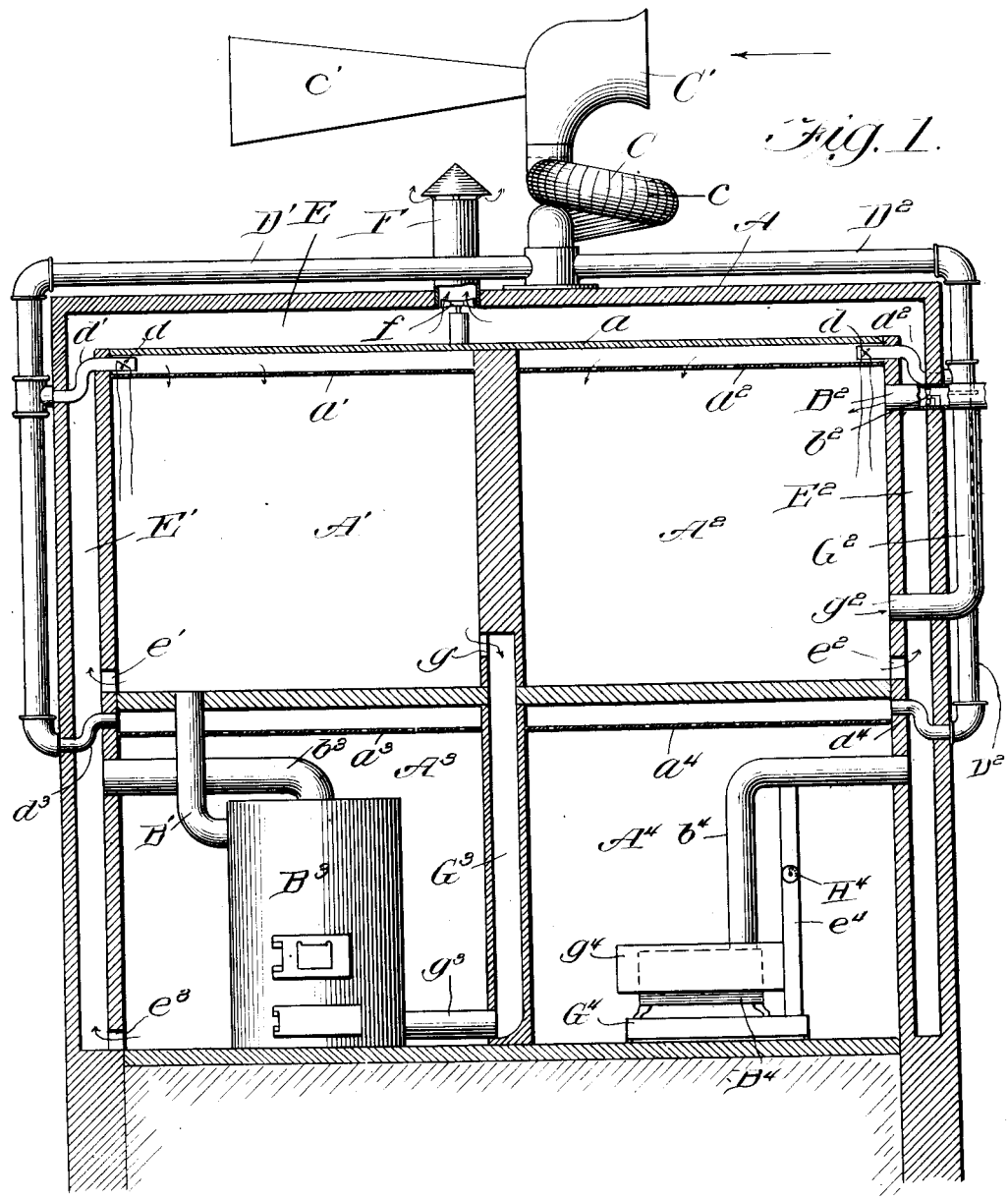

UNITED STATES PATENT OFFICE.

BENJAMIN W. DAVIS, OF PHILLIPS, WISCONSIN.

HEATING AND VENTILATING SYSTEM.

1,179,406.  Specification of Letters Patent.  Patented Apr. 18, 1916.

Application filed January 6, 1906. Serial No. 294,822.

*To all whom it may concern:*

Be it known that I, BENJAMIN W. DAVIS, a citizen of the United States, residing at Phillips, county of Price, State of Wisconsin, have invented a certain new and useful Improvement in Heating and Ventilating Systems, and declare the following to be a full, clear, and exact description of the same, such as will enable others skilled in the art to which it pertains to make and use the same, reference being had to the accompanying drawings, which form a part of this specification.

My invention relates in general to systems of ventilation, and more particularly to a system in which fresh air is received at the top of a room, car, or other inclosed space and the foul air discharged adjacent the floor.

As the weight of foul air causes it to fall while hot air rises, it is desirable that the circulation in ventilating a room or car should be from the bottom thereof to the atmosphere and from the atmosphere to the room or car near the ceiling or top thereof. In this manner the hot air at the top of the room or other inclosed space serves to heat the fresh air as it is admitted, while the foul air is expelled when it falls to the floor. It is desirable that the fresh air should be admitted in quantities varying according to the number of persons in the inclosed space and that it should be distributed at the top of the inclosed space so that it will descend evenly throughout the space. It is desirable, in addition to the admission of fresh air and the expulsion of foul air, that there should be a circulation of the air within the inclosed space so that it may be as nearly uniform in temperature as possible, and so that the foul air will be brought down to the outlet and expelled.

The primary object of my invention is to provide a ventilating system for rooms, cars, or other inclosed spaces in which the fresh air will be admitted at the top of and evenly distributed throughout the inclosed space, in which the foul air will be expelled from the bottom of the inclosed space, and in which the circulation of air within the space will be produced.

A further object of my invention is to provide means for delivering fresh air to the interior of a room or other inclosed space adjacent the top thereof which will free the air from dust, cinders, and other foreign matter.

A still further object of my invention is to provide a ventilating system which will be simple in arrangement, comparatively inexpensive to install, and efficient in operation.

The embodiments of my invention herein disclosed may be generally described as consisting of a perforated false ceiling adjacent the usual ceiling of a room, or other inclosed space, an air inlet above the false ceiling, an outlet for foul air adjacent the floor of the inclosed space, a flue into which the outlet discharges, means for creating a draft through such flue, and means for heating the inclosed space.

My invention will be more fully described hereinafter with reference to the accompanying drawing in which the same is illustrated as embodied in several convenient and practical forms, and in which,—

Figure 1 is a vertical central sectional view showing four rooms of a house each provided with a different specific embodiment of my invention; Fig. 2 a vertical central section of still another embodiment of my invention; Fig. 3 a sectional view on line 3—3 Fig. 2; Fig. 4 a detail view of the damper and indicator therefor; Fig. 5 a sectional view on line 5—5 Fig. 2; Fig. 6 a vertical central section of a car equipped with my ventilating system, and Fig. 7 a plan view of the centrifugal inlet conduit shown in Fig. 6.

The same reference characters are used to indicate similar parts in the several views of the drawings.

Referring more particularly to Fig. 1, reference characters A', $A^2$, $A^3$ and $A^4$ indicate four adjacent rooms or other inclosed spaces each equipped with a different specific form of my ventilating system. The room A' is heated by means of a furnace $B^3$ located in the room $A^3$, a hot air flue B' leading to the room A'. E' indicates a vertical flue with which the room A' communicates near the bottom thereof through an outlet $e'$. The smoke pipe $b^3$ of the furnace $B^3$ may also communicate with the flue E'. The upper end of the flue E' communicates with a horizontal flue E located above the ceiling $a$ and beneath the roof A. F indicates an outlet from the horizontal flue E leading to the atmosphere. $f$ indicates a fan for blowing air from the flue E to the outlet F. $G^3$ indicates a circulating shaft which communicates with the interior of the room $A'$ through an opening $g'$ and with which the furnace $B^3$ communicates adjacent the bottom thereof through a pipe $g^3$. The room $A^3$ is heated directly by the furnace $B^3$ and communicates with the flue $E'$ through an opening $e^3$ adjacent the floor of the room.

The rooms $A'$ and $A^3$ are provided with perforated partitions or false ceilings $a'$ and $a^3$ respectively located a short distance below the usual ceilings. Fresh air is delivered to the rooms above the false ceilings by means of inlet conduits $d'$ and $d^3$ respectively which communicate with a conduit $D'$ leading from a cowl $C'$. A second inlet conduit for fresh air $D^2$ leads from the cowl $C'$ and communicates by means of conduits $d^2$ and $d^4$ with the rooms $A^2$ and $A^4$ respectively immediately above perforated false ceilings $a^2$ and $a^4$ therein.

The room $A^2$ is provided with hot air through a conduit $B^2$, a blower $b^2$ being preferably provided for forcing the hot air into the room. A circulation of the air in the room is caused by extending a conduit $q^2$ from a point near the floor to the conduit $B^2$. The room $A^2$ communicates through an opening $e^2$ with an outlet flue $E^2$ corresponding to the outlet flue $E'$ and communicating at its upper end with the horizontal flue E.

The room $A^4$ is provided with a stove $B^4$ mounted upon a platform $G^4$ supported a short distance above the floor. An apron depends from the platform $G^4$ and terminates adjacent the floor.

$b^4$ indicates a smoke pipe leading from the stove $B^4$ to the outlet flue $E^2$. A conduit $e^4$ leads from the space below the platform $G^4$ to the smoke pipe $b^4$.

The cowl $C'$ is provided with a vane $c'$ so that the mouth of the cowl will face the direction from which the wind is blowing. The cowl $C'$ is provided with a spiral conduit C leading to the air inlet pipes $D'$ and $D^2$. Openings $c$ are provided in the outer surface of the spiral conduit C so that dust, cinders, and other foreign matter will be discharged by centrifugal force as air passes from the cowl to the inlet pipes.

The volume of fresh air supplied to the rooms may be regulated by means of valves such as shown at $d$. In this manner the amount of fresh air supplied may be varied according to the number of persons occupying the room.

In Figs. 2, 3, 4 and 5 I have illustrated still another embodiment of my invention, in which $A^5$ indicates a room or other inclosed space provided with a perforated partition or false ceiling $a^5$ into the space above which fresh air is delivered through the conduit $d^5$. This conduit is preferably formed with a downwardly-extending portion on the outside of the room which serves as a trap to prevent the escape of the hot air from the room inasmuch as the cold air will have to descend against the hot air in order to pass from the room to the atmosphere. $B^5$ indicates a radiator to which steam or hot water is delivered by the supply pipe $b^5$. A shield $g^5$ surrounds the radiator but is open at its top and bottom in order to permit the free upward passage of air as it is heated by contact with the coils of the radiator. The radiator is supported upon a platform $G^5$ located above the floor, such platform having a downwardly-extending apron terminating adjacent the surface of the floor. $E^5$ indicates an outlet flue for discharging the foul air from the room as the fresh air is admitted. An opening $e^5$ is formed in the flue $E^5$ below the platform $G^5$ so that the foul air is drawn from beneath the platform $G^5$ into the flue. In order to create a draft through the flue an extension $F^5$ leading from the supply pipe $b^5$ projects upwardly within the flue and is provided with an air vent valve $f^5$ at its upper end. In order to permit access to the vent valve and also for the purpose of ventilation a door $f^6$ is provided in the outlet conduit. In order that the amount of fresh air delivered to the room may be regulated according to the number of occupants of the room, a damper $h^5$ is provided within the flue $E^5$, such damper having a pointer $H^5$ which coöperates with a scale or dial, as shown in Fig. 4, to indicate the position of the damper within the flue and consequently the extent of the passage way through the flue which of course determines the amount of fresh air which may be drawn into the room to replace the expelled foul air.

The flue $E^5$ may serve to discharge the foul air from a series of rooms, a second room $A^6$ being indicated below the room $A^5$ in Fig. 2.

In Fig. 6 I have illustrated my improved ventilating system applied to a car $A^7$ of any usual construction. $a^7$ indicates the perforated false ceiling while $E^7$, $E^7$ indicate outlet flues at the ends of the cars with which the interior of the car communicates through openings $e^7$, $e^7$ near the floor. Any suitable form of heater, such as indicated at $B^7$ may be provided for heating the interior of the car. The fresh air is admitted to the space above the false ceiling $a^7$ through a revolving cowl $C^7$ comprising a circular conduit C having openings $c$ in the outer surface thereof to permit the discharge of cinders or other foreign matter by centrifugal force. The shape of the cowl is such that the opening leading thereinto will face the direction toward which the wind is blowing. In order that the fresh air may be forced into the cowl, a blower such as indicated at $f^7$ may be employed if desired. Any suitable means (not shown) may be provided for actuating the blower.

In each of the several embodiments of my invention, the fresh air is admitted to the space above a perforated false ceiling and is there distributed evenly throughout the room. As the hot air in the room rises it is obvious that the fresh air is heated thereby upon its admission to the space above the false ceiling. In each embodiment of my invention the foul air is discharged from the room near the floor, and as it is discharged it is replaced by the admission of fresh air. The volume of fresh air admitted and consequently the amount of foul air discharged may be regulated in the arrangement shown in the rooms A′, A² and A³ by the valves $d$, and in the arrangement shown in the rooms A⁴ and A⁵ by regulating the positions of the dampers H⁴ and $h^5$ in the outlet conduits. The draft in the outlet conduit is promoted in the various forms of the invention shown in Fig. 1 by the products of combustion discharged from the furnace or stove to the outlet conduits also by the fan $f$, and in the form shown in Fig. 2 by the extension of the supply conduit located within the flue. In the arrangement shown in Fig. 6 the blower $f^7$ promotes the circulation.

The scales with which the pointers of the dampers H⁴ in Fig. 1 and $h^5$ in Figs. 2 and 4 register may be provided with different graduations for different temperatures as indicated in Fig. 4. When the temperature is colder the opening of the damper should be less than when it is warmer consequently I have indicated one scale with which the pointer coöperates when it is below zero, another when the temperature is zero, and a third when it is above zero.

In addition to the circulation due to the discharge of foul air and admission of fresh air, a circulation of air within the room is preferably provided by suitable means, such for instance as the flue G³ leading from the room A′ to the furnace and by the conduit G² leading from the room A² to the conduit for supplying the heated air. In the rooms A⁴ and A⁵ the circulation is promoted by the shields located around the heaters which serve to draw the cool air near the floor to the heaters and, as the air becomes heated, direct the same upwardly toward the ceiling. This circulation of air within the rooms serves not only to produce uniform temperature, but also to direct the foul air toward the floor where it will be discharged.

The inlet pipes $d'$, $d^2$, $d^3$ and $d^4$ shown in Fig. 1 are preferably bent downwardly so that portions thereof are in lower planes than their discharge ends in order that the warm air may be prevented from passing outwardly through the conduits D′ and D² when there is no wind blowing. The downwardly curved portions of these inlet pipes serve as traps in the same manner as above explained in connection with the depending inlet conduits $d^5$ shown in Fig. 2.

It will be observed that by supporting the heater upon a platform above the floor and providing an apron depending around the platform, the foul air is prevented from rising into contact with the heater and being thereby put into circulation in a room, but is directed to the opening in the outlet flue.

From the foregoing description it will be observed that I have invented an improved system of ventilation by means of which a room, car, or other inclosed space will be supplied with fresh air to replace discharged impure air, and by means of which the atmosphere within the inclosed space will be kept in circulation.

Having now fully described my invention, what I claim as new and desire to secure by Letters Patent is:

1. In a heating and ventilating system for a room or other inclosed space, the combination with an inlet conduit for cool fresh air communicating with said space near the top thereof, of a heater within said space, means for supporting said heater above the bottom of said space, and an outlet flue having an opening leading therein from below said heater.

2. In a heating and ventilating system for a room or other inclosed space, the combination with an inlet conduit for fresh air communicating with said space near the top thereof, means for evenly distributing the air from said conduit across said space, of a heater within said space, a platform for supporting said heater above the floor of the room, an apron depending from said platform, and an outlet flue having an opening leading thereinto from beneath said platform.

3. In a heating and ventilating system for a room or other inclosed space, a horizontal partition close to the ceiling thereof and having perforations therein, a conduit leading into the space between the ceiling and the partition, said conduit having its other end open to the surrounding air at a lower point than the said partition, an outlet conduit leading from the bottom of the said space, a heater for the inclosed space, and a pipe leading from said heater terminating in said outlet conduit for supplying fluid pressure thereto to accelerate the outflow of air.

4. In a heating and ventilating system for a room or other inclosed space, the combination with an air inlet conduit for cool fresh air communicating with said space near the top thereof, a horizontal perforated partition extending across said space adjacent the top thereof below said inlet conduit for distributing the cool air throughout said space, a heater located within said space adjacent the bottom thereof, and an outlet flue having an opening leading thereinto at a horizontal level below the top of said heater.

In testimony whereof, I sign this specification in the presence of two witnesses.

BENJAMIN W. DAVIS.

Witnesses:
GEO. L. WILKINSON,
C. A. MULLEN.